United States Patent [19]

Joiner, Jr.

[11] Patent Number: 4,559,563

[45] Date of Patent: Dec. 17, 1985

[54] ADAPTIVE PREDICTION FOR BINARY ENCODED DOCUMENTS CONTAINING A MIXTURE OF TEXT, LINE DRAWINGS AND HALFTONES

[75] Inventor: Ronald E. Joiner, Jr., Pasadena, Calif.

[73] Assignee: Xerox Corporation, Stamford, Conn.

[21] Appl. No.: 540,950

[22] Filed: Oct. 11, 1983

[51] Int. Cl.$^4$ .................. H04N 1/00; H04N 7/12; H04N 1/40

[52] U.S. Cl. .................. 358/260; 358/135; 358/283

[58] Field of Search .......... 358/283, 260, 135; 382/56

[56] References Cited

U.S. PATENT DOCUMENTS

| | | | |
|---|---|---|---|
| 3,185,824 | 5/1965 | Blasbalg et al. | 235/310 |
| 3,769,453 | 10/1973 | Bahl et al. | 358/260 |
| 3,937,871 | 2/1976 | Robinson | 358/260 |
| 4,141,034 | 2/1979 | Netravali et al. | 358/135 |
| 4,144,547 | 3/1979 | Stoffel | 358/260 |
| 4,435,726 | 3/1984 | Liao | 358/260 |

*Primary Examiner*—Howard W. Britton
*Assistant Examiner*—John K. Peng
*Attorney, Agent, or Firm*—Robert E. Cunha

[57] ABSTRACT

This is a circuit and method for adaptively selecting one of a plurality of predictor patterns to encode a stream of image data blocks such as would be output from a raster-input-scanner. A variety of halftone and nonhalftone predictor patterns are used and compared, with the best one being selected to predict the next block. Using this technique, the best predictor pattern is usually selected, predicted data buffering is not needed, and no code need be transmitted with the data to the receiver to specify the predictor to be used in the deprediction process since the same basic information is also available to the receiver.

13 Claims, 6 Drawing Figures

$\text{CurrentLine} = X_i$ For i IN [1..NbytesPerScanline].  (A-1)
$\quad\quad\quad\quad = x_i$ For i IN [1..NbytsPerScanline]

$\text{PreviousLine} = Y_i$ For i IN [1..NbytesPerScanline].  (A-2)
$\quad\quad\quad\quad = y_i$ For i IN [1..NbytsPerScanline]

$X_i = Y_i = 0$ For i < or i > NbytesPerScanline  (A-3)

$\text{predictedByte} = P(X_i),$  (A-4)

$\text{errorByte} = E[P(X_i)] = P(X_i) \text{ XOR } X_i.$  (A-5)

$P_i$ = the predictor assigned to p for the $i^{th}$ byte.  (A-6)

errorCount = C[errorByte] =  (A-7)

0    0 errors
        1    1 error
        2    2 errors
        3    3 or more errors
        3    P not enabled $p_{i-1} \leftarrow P_n$    IF $C[E[P_n(X_{i-1})]] < C[E[P_m(X_{i-1})]]$    (A-13)

$p_{i-1} \leftarrow P_m$    IF $C[E[P_m(X_{i-1})]] < C[E[P_n(X_{i-1})]]$ $p_{i-1} \leftarrow p_{i-2}$    IF $C[E[P_n(X_{i-1})]] = C[E[P_m(X_{i-1})]]$

FOR EACH LINE, THE OUTPUT OF THE PREDICTOR IS $E[p_{i-1}(X_i)]$ FOR i IN [1...N BYTES PER LINE]  (A-14)

$$\text{predictedByte} = P(X_i), \tag{A-4}$$

$$\text{errorByte} = E[P(X_i)] = P(X) \text{ XOR } X_i. \tag{A-5}$$

$$P_i = \text{the predictor assigned to p for the } i^{th} \text{ byte.} \tag{A-6}$$

$$\text{errorCount} = C[\text{errorByte}] = \tag{A-7}$$

```
                    0   0 errors
                    1   1 error
                    2   2 errors
                    3   3 or more errors
                    3   P not enabled
```

$$\text{nonHT}_{i-1} \leftarrow \text{text} \quad \text{IF } C[E[\text{text}(X_{i-1})]] < C[E[\text{PreBit}(X_{i-1})]] \tag{A-8}$$

$$\leftarrow \text{PreBit} \quad \text{IF } C[E[\text{PreBit}(X_{i-1})]] < C[E[\text{text}(X_{i-1})]]$$

$$\leftarrow \text{nonHT}_{i-2} \quad \text{IF } C[E[\text{text}(X_{i-1})]] = C[E[\text{PreBit}(X_{i-1})]]$$

$$\text{final}_{i-1} \leftarrow \text{nonHT}_{i-1} \quad \text{IF } C[E[\text{nonHT}_{i-1}(X_{i-1})]] < C[E[\text{ht}_{i-2}(X_{i-1})]] \tag{A-9}$$

$$\leftarrow \text{nonHT}_{i-1} \quad \text{IF } C[E[\text{nonHT}_{i-1}(X_{i-1})]] = C[E[\text{ht}_{i-2}(X_{i-1})]]$$
$$\text{AND } \text{final}_{i-2} \text{ NOT IN } [HT^5 - HT^{16}]$$

$$\leftarrow \text{ht}_{i-2} \quad \text{IF } C[E[\text{ht}_{i-2}(X_{i-1})]] < C[E[\text{nonHT}_{i-1}(X_{i-1})]]$$

$$\leftarrow \text{ht}_{i-2} \quad \text{IF } C[E[\text{nonHT}_{i-1}(X_{i-1})]] = C[E[\text{ht}_{i-2}(X_{i-1})]]$$
$$\text{AND } \text{final}_{i-2} \text{ IN } [HT^5 - HT^{16}]$$

$$\text{ht}_{i-1} \leftarrow \text{newHT}_{i-2} \quad \text{IF } C[E[\text{newHT}_{i-2}(X_{i-1})]] < C[E[\text{ht}_{i-2}(X_{i-1})]] \tag{A-10}$$

$$\leftarrow \text{ht}_{i-2} \quad \text{IF } C[E[\text{ht}_{i-2}(X_{i-1})]] <= C[E[\text{newHT}_{i-2}(X_{i-1})]]$$

$$\text{newHT}_{i-1} \leftarrow \text{newHT}_{i-2} \tag{A-11}$$

FOR J IN [5..16]

$$\text{newHT}_{i-1} \leftarrow HT^J \quad \text{IF } C[E[HT(X_{i-1})]] < C[E[\text{newHT}_{i-1}(X_{i-1})]]$$

For each line, the output of the predictor is $$E[\text{final}_{i-1}(X_i)] \quad \text{FOR i IN } [1..\text{NbytesPerLine}]. \tag{A-12}$$

ADAPTIVE PREDICTOR

|  | BIT ABOVE |  |
|---|---|---|
| (B-1) |  | X<br>P |
| (B-2) | PRE BIT | XP |
| (B-3) | ht5 (5 bits back)<br>ht6 (6 bits back) | X0000P<br>X00000P |
|  | ht16 (16 bits back) | X000000000000000P |

P - PREDICTED BIT
X - BIT USED IN PREDICTION
0 - INTERVENING BIT, NOT USED IN PREDICTION

ADAPTIVE PREDICTOR SET

*FIG. 5*

| | |
|---|---|
| $final_{-1}$ | ← First enabled predictor in enabledSet |
| $nonHT_{-1}$ | ← First enabled non-halftone predictor in enableSet<br>If not enabled THEN text |
| text | ← Font IF enableFont, BitAbove IF enableBitAbove<br>(undefined results if both enabled) |
| $ht_{-1}$ | ← First enable halftone predictor in enableSet<br>IF none enabled THEN HT5 |
| $newHT_{-1}$ | ← First enabled halftone predictor in enableSet<br>IF none enabled THEN HT5 |

*FIG. 6*

ADAPTIVE PREDICTION FOR BINARY ENCODED DOCUMENTS CONTAINING A MIXTURE OF TEXT, LINE DRAWINGS AND HALFTONES

BACKGROUND OF THE INVENTION

This invention relates to a system for compressing or compacting halftone, line and text data where resolution and halftone screen frequency may be unknown, and more particularly to a circuit and method for adaptive predicting which uses a plurality of predictor patterns but which does not require transmission of additional code to the receiver to identify the particular pattern used.

In systems that digitally reproduce documents or other pictorial information, it is generally desirable to compress the data to reduce the requirements on system bandwidth and storage. Compression is achieved by encoding long runs of zeros or ones. Larger runs of zeros can be achieved by predicting each bit and denoting correct prediction by a zero and an error by a one. The need for prediction is greatest for halftoned data which is almost exclusively very short runs of zeros and ones.

It is desirable that an image reproducing system compress images well regardless of their composition. Since prediction is based on the correlation between neighboring data bits, a problem arises from the fact that the correlation between bits in documents containing halftone pictures is fundamentally different from that in documents containing text and line drawings. Predictors that work well for one do not work well for the other. Furthermore, the correlation in documents containing halftones is highly dependent upon the scanning resolution and the screen frequency of the halftones. Given a document composed of text, a halftone picture from a magazine, and a halftone picture from a newspaper, no single predictor would perform well on all regions of the document.

To accommodate such a mixture of data, multiple predictor arrangements have been employed in the past. These schemes typically utilize selector logic to choose from among a group of predictors that predictor which best predicts the present data block. The main disadvantage of such schemes is the necessity to include predictor change codes as part of the final output so that the receiver's decompressor will know which predictor pattern to use in the deprediction process. The addition of these codes result in poorer compression. A trade-off must be made by choosing a larger data block size over which a predictor is applicable. This leads to a second disadvantage, the error codes for each predictor must be buffered for the entire block pending the outcome of the selection process.

It will become apparent that the drawbacks accompanying past multiple predictor arrangements have been overcome by the improved predictor algorithm employed by the circuit herein described.

The present invention is defined by a set of simple predictors and an algorithm for selecting the appropriate predictor for each current data block.

It is an object of the present invention to provide an improved system for adaptively predicting documents containing halftone, text, and line copy data.

It is an object of the present invention to provide an adaptive prediction process that does not require any knowledge of the composition of the document to be predicted.

It is an object of the present invention to provide method and apparatus for predicting halftone data whose screen frequency and resolution are unknown.

It is an object of the present invention to provide an adaptive prediction process that does not require the transmission of additional codes.

It is an object of the present invention to provide an adaptive prediction process that does not require buffering large amounts of predictor output while predictor selection is pending.

It is an object of the present invention to provide an adaptive prediction process that is able to adapt quickly to changing correlations.

The fundamental idea behind the current invention is that both the predictor and the depredictor select the predictor (depredictor) for the current data block based on which predictor would have performed best (least errors) on the previous data block. If a particular predictor would have worked well on the previous data block, it is likely that it will work well on the next data block. Since the data necessary for making the decision is available to both transmitter and receiver, no extra data need be transmitted.

The general rule is that the predictor that performed best on the previous block will be used for the current block, and that in case of ties, the predictor used previously (or the predictor in the class that was used previously) will be used. There is an exception, and that is for halftones, where the pitch inevitably remains fixed for the duration of the image. To take advantage of this, a new halftone predictor will not be selected unless it performs better than the previously selected one for two consecutive blocks.

A more complete understanding of the present invention and its advantages may be obtained by reference to the following description taken in conjunction with the accompanying drawings in which:

Figure 1:
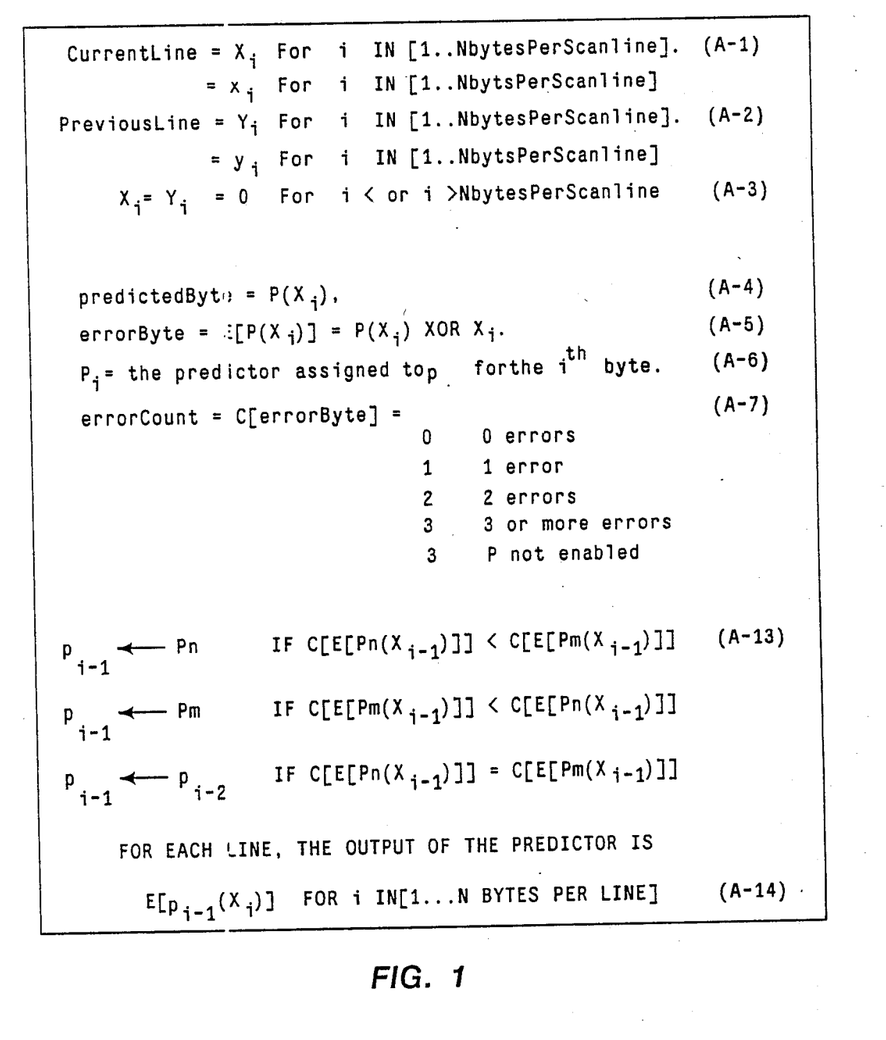
FIG. 1 is a mathematical representation of the simplified adaptive predictor algorithm.

The algorithm herein disclosed is applicable to any multiple predictor system. FIG. 1 mathematically describes the simplest embodiment of the present invention in which there are only two predictors in the system. As indicated by equation A-14, where a data block is assumed to be one byte, the error byte for any byte $X_i$ is equal to the error byte of the predictor selected from the previous byte, $p_{i-1}$, operating on $X_i$. Equation A-13 indicates how a predictor is assigned to the $(i-1)^{th}$ byte in this embodiment. At the $i^{th}$ byte the error count of the predictors Pm and Pn operating on $X_{i-1}$ are compared. If the error count of Pm is less than that of Pn, Pm is assigned to $p_{i-1}$. Likewise, if the error count of Pn is less than that of Pm, Pn is assigned to $p_{i-1}$. In the case when the error counts are equal, the predictor selected on the previous byte, $p_{i-2}$, is assigned to $p_{i-1}$.

Figure 2:
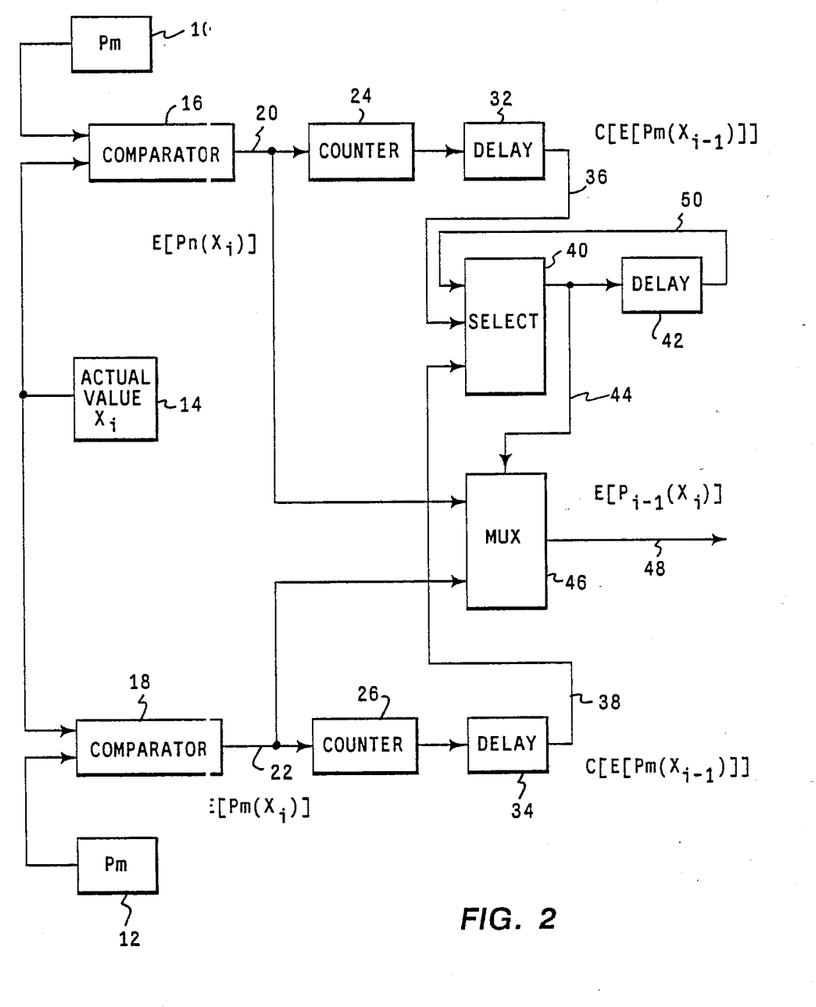
FIG. 2 is a block diagram of a simplified adaptive predictor apparatus of the present invention.

FIG. 2 shows a block diagram of the simple adaptive predictor described above. The predicted values of $X_i$ from predictors Pn, 10, and Pm, 12, are input along with the actual value of $X_i$, 14, to comparators 16 and 18 respectively. The outputs of comparators 16 and 18 are the error bytes $E[Pn(X_i)]$, 20, and $E[Pm(X_i)]$, 22. These error bytes 20 and 22 are input to counters 24 and 26 where the number of error bits in each error byte is counted. The error bytes 20 and 22 are also input to multiplexor 46. The outputs of counters 24 and 26 are the error counts $C[E[Pn(X_i)]]$, 28, and $C[E[Pm(X_i)]]$, 30. The error counts are input to and delayed by delays 32 and 34 so that the output of the delays is $C[E[Pn(X_{i-1})]]$, 36 and $C[E[Pm(X_{i-1})]]$, 38, respectively. Signals 36 and 38 are the error counts of the predictors Pn and Pm from the previous byte and indicate the performance of the predictors Pn, 10 and Pm, 12 on the byte $X_{i-1}$. These error counts are input to selector 40 along with information indicating which predictor performed best on the previous byte, signal 50. Selector 40 compares the error counts and selects the smallest with ties resolved in favor of the predictor selected on the previous byte. The output of selector 40, signal 44 indicates which predictor performed best on $X_{i-1}$. This is the predictor assigned to $p_{i-1}$. Signal 44 is input to delay 42 and the select input of multiplexor 46. Signal 44 is delayed by delay 42 so that the output of delay 42, signal 50, indicates which predictor performed best on the previous cycle. Input to the select input of multiplexor 46, signal 44 forces the selection, as the output of multiplexor 46, the error byte of the predictor assigned to $p_{i-1}$ operating on $X_i$, $E[p_{i-1}(X_i)]$. This signal, signal 48, is the output of the predictor ready for encoding.

Figure 3:
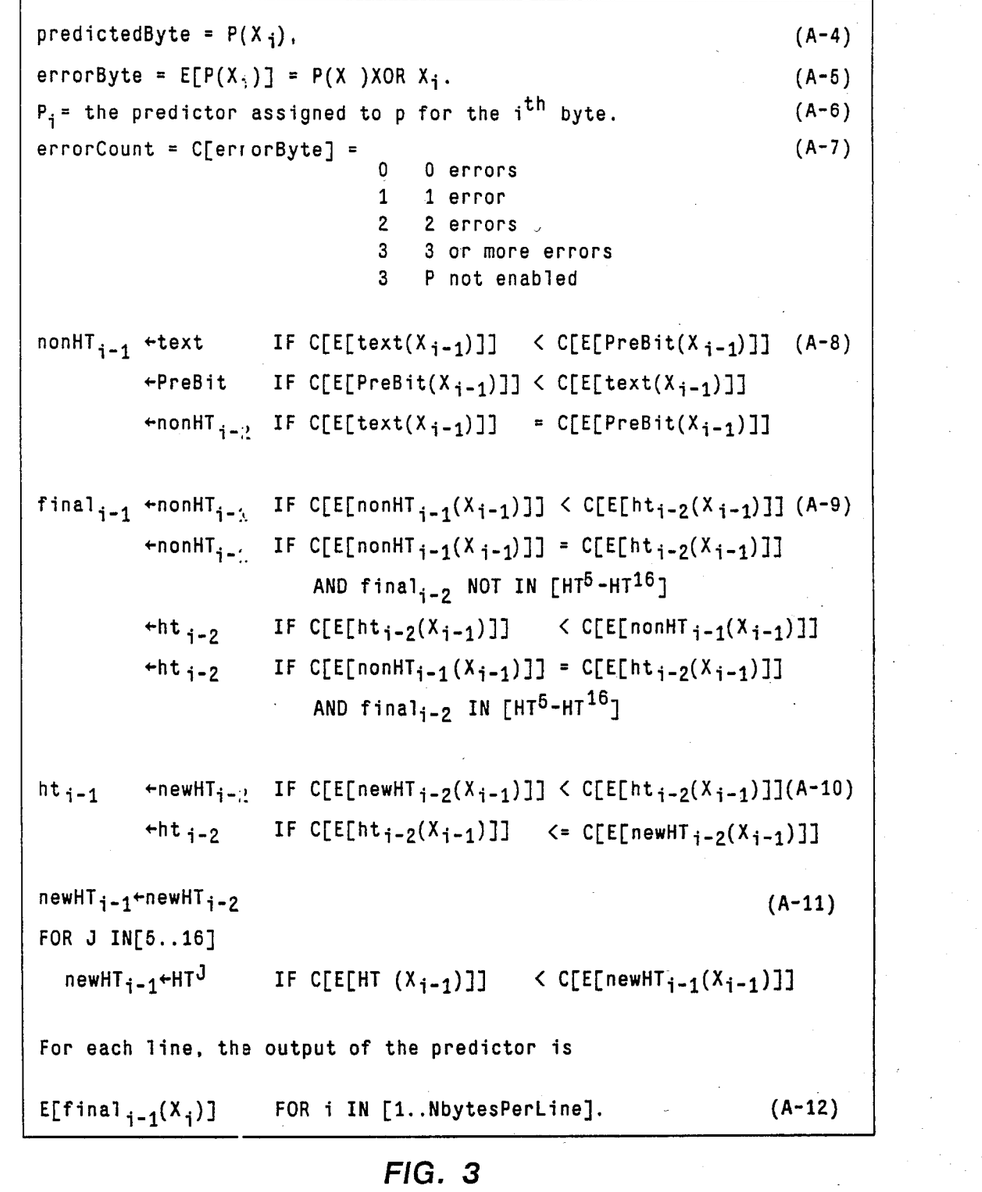
FIG. 3 is a mathematical representation of the adaptive predictor algorithm.

The adaptive predictor algorithm of the present invention is described mathematically in FIG. 3. Although the adaptive process here is basically the same as in the simplified example above, i.e., the predictor selected for predicting a particular byte or data block is based on a comparison of predictor performance on previous bytes or data blocks, it differs in that the selection process is segmented. Specifically, the process takes place in two steps. In the first step, the past performance of the halftone predictors is compared and in a separate comparison the past performance of the nonhalftone predictors are evaulated. The two best predictors from the first comparisons, $ht_{i-2}$ and $nonHT_{i-1}$, are compared in the second step and the better of the two, $final_{i-1}$, is used to predict the current byte. Again, as in the example above and as indicated by FIG. 3 equation A-12, the error byte for any byte $X_i$ is equal to the error byte resulting from $final_{i-1}$ operating on $X_i$.

Figure 5:
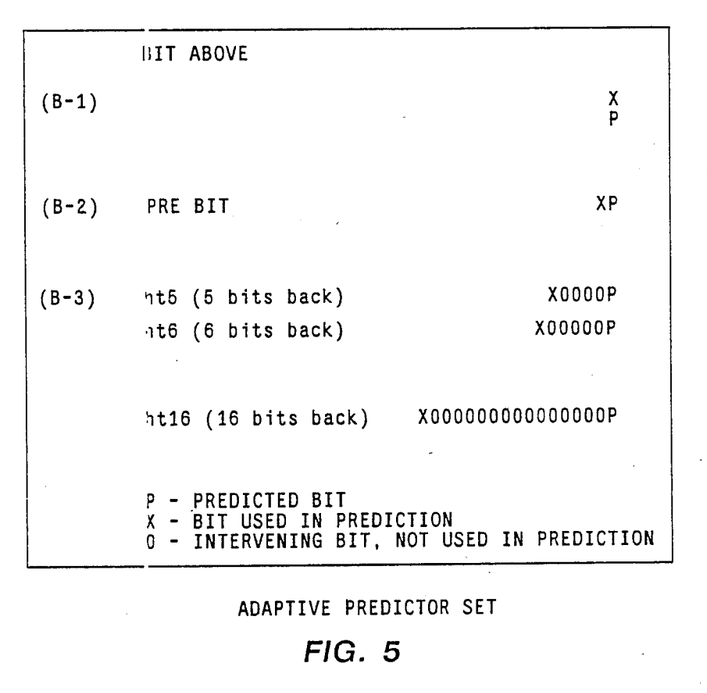
FIG. 5 is the bit patterns of an adaptive predictor set.
Figure 6:
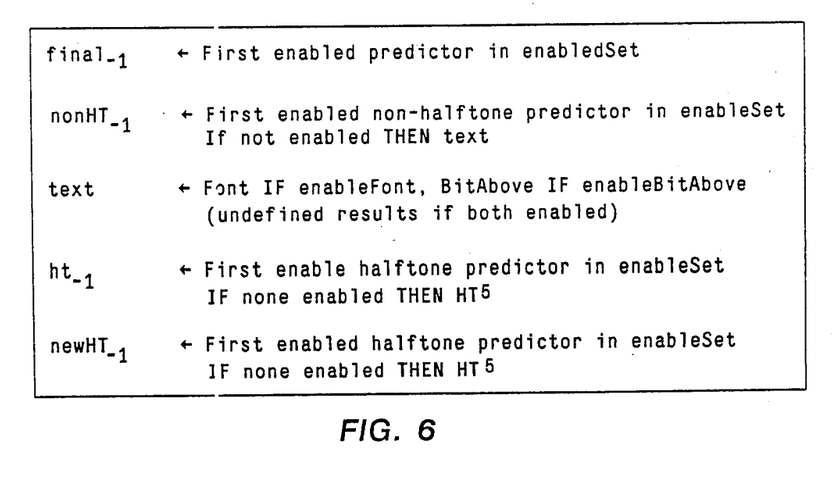
FIG. 6 defines the initial conditions for the variables defined in FIG. 3.

The nonhalftone predictor selection process described in FIG. 3 by equation A-8 is similar to the simple algorithm described in FIG. 1. In the preferred embodiment, the nonhalftone predictor set would consist of two nonhalftone predictors: Bitabove and PreBit. The bit pattern for such a set is shown in FIG. 5. As indicated in B-1, the Bitabove predictor predicts that the actual bit is the same as the corresponding bit in the previous scan line. B-2 shows that PreBit predicts that the actual bit is the same as the previous bit. At the $i^{th}$ byte the performance of Bitabove and PreBit operating on the previous byte, $X_{i-1}$, is compared. If the error count of Bitabove is less than that of PreBit, Bitabove is assigned to $nonHT_{i-1}$. Likewise, if the error count of PreBit is less than that of Bitabove, PreBit is assigned to $nonHT_{i-1}$. In the case when the error counts are equal, the predictor selected on the previous byte, $nonHT_{i-2}$, is assigned to $nonHT_{i-1}$.

Single bit predictor patterns are shown in FIG. 5, but multiple bit patterns comprising adjacent bits on the current and previous lines are also used with alternate embodiments of this invention.

The halftone predictor selection process described in FIG. 3 by equations A-10 and A-11 is a two-tiered process slightly more complex than those previously described. This results in the halftone predictor which had the best performance two bytes previously, $ht_{i-2}$, being used in the final step of the comparison. In the preferred embodiment there are a number of halftone predictors covering most of the combinations of screen frequencies and resolutions, in this case twelve. The bit pattern for such a set is shown in FIG. 5. Halftone prediction is based on the repetitive nature of halftone images, that is, the fact that halftone images consist of periodic repetition of black and white bits. So, as described in B-3, each halftone predictor predicts that the actual bit is the same as a bit a certain number of bits back.

The first tier in the halftone predictor selection process is the selection of $newHT_{i-1}$ described by FIG. 3 equation A-11. At the $i^{th}$ byte, the error count of each halftone predictor $HT^J$ (where J indicates the number of bits back and is related to the screen frequency) is compared to the error count of the predictor currently assigned to $newHT_{i-1}$. If the error count of a predictor $HT^J$ operating on the previous byte $X_{i-1}$ is less than that of $newHT_{i-1}$ operating on $X_{i-1}$, $HT^J$ is assigned to $newHT_{i-1}$. At the beginning of this process the predictor assigned to $newHT_{i-1}$ at the previous byte, $newHT_{i-2}$, is assigned to $newHT_{i-1}$. In this selection process ties are resolved in favor of the previous $newHT_{i-1}$, $newHT_{i-2}$, or the predictor corresponding to the highest screen frequency.

The second tier in the halftone predictor selection process is the selection of $ht_{i-1}$ described by FIG. 3, equation A-10. At the $i^{th}$ byte the error count of the predictor selected as $newHT_{i-1}$ at the previous byte, $newHT_{i-2}$, is compared to the error count of the predictor selected as $ht_{i-1}$ at the previous byte, $ht_{i-2}$. If the error count of $newHT_{i-2}$ operating on the previous byte $X_{i-1}$ is less than that of $ht_{i-2}$ operating on $X_{i-1}$, $newHT_{i-2}$ is assigned to $ht_{i-1}$. If the error count of $ht_{i-2}$ operating on $X_{i-1}$ is less than or equal to that of $newHT_{i-2}$ operating on $X_{i-1}$, $ht_{i-2}$ is assigned to $ht_{i-1}$.

In the second step of the overall adaptive process described in FIG. 3, equation A-9, the selected nonhalftone predictor, $nonHT_{i-1}$, is compared to the selected halftone predictor, $ht_{i-2}$. If the error count of $nonHT_{i-1}$ operating on the previous byte, $x_{i-1}$, is less than that of $ht_{i-2}$ operating on $X_{i-1}$, $nonHT_{i-1}$ is assigned to $final_{i-1}$. If the error count of $ht_{i-2}$ operating on $X_{i-1}$ is less than that of $nonHT_{i-1}$ operating on $X_{i-1}$, $ht_{i-2}$ is assigned to $final_{i-1}$. In the case when the error counts are equal, $nonHT_{i-1}$ is assigned to $final_{i-1}$ when $final_{i-2}$ was a nonhalftone predictor and $ht_{i-2}$ is assigned to $final_{i-1}$ when $final_{i-2}$ was a halftone predictor. The predictor chosen as $final_{i-1}$ is used to predict the current byte so that the adaptive predictor output is $E[final_{i-1}(X_i)]$.

Figure 4A:
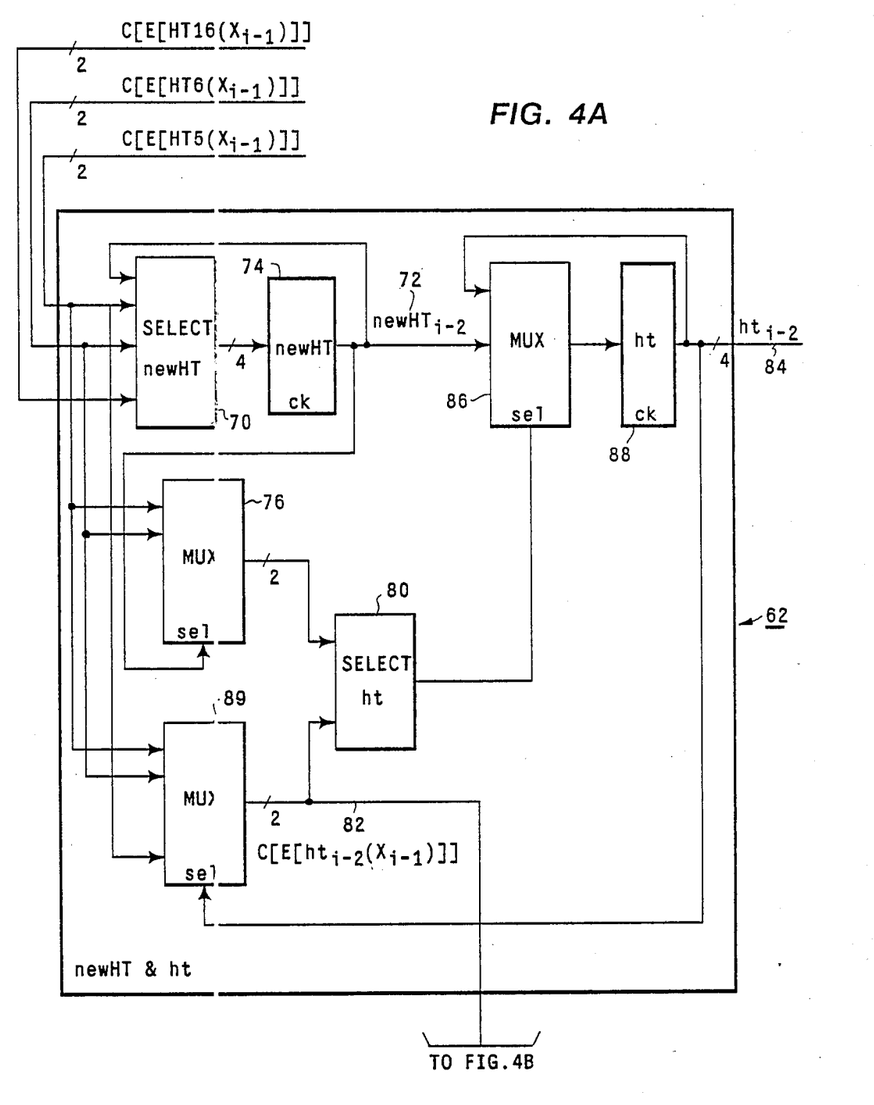
FIG. 4 is a block diagram of the adaptive predictor apparatus of the present invention.
Figure 4B:
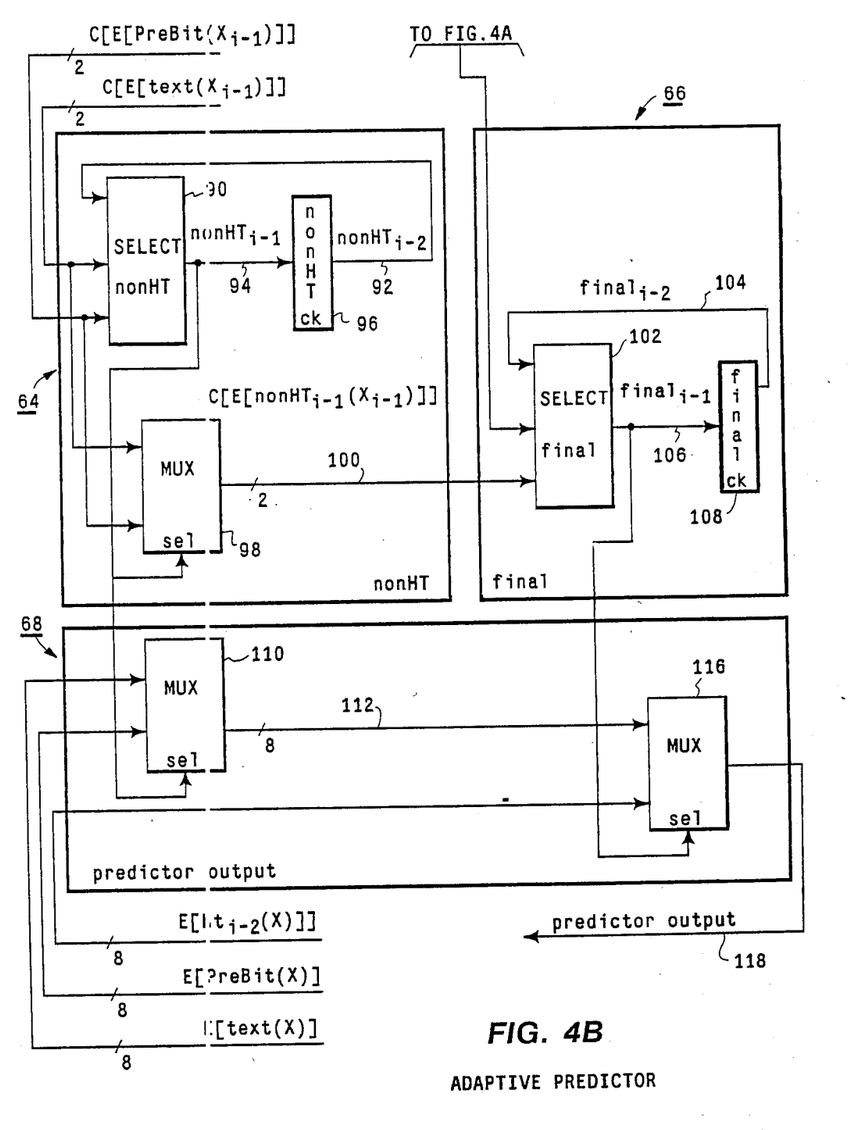

The two step selection process described mathematically in FIg. 3 is apparent in the block diagram of the adaptive predictor, FIG. 4. First, both the error count from the previous prediction and the present error signal of each of the predictors is delivered to the adaptive apparatus 60 of FIG. 4. In the first step the halftone predictors performance is compared by selection group 62 and in a separate but simultaneous process the performance of the Bitabove and Prebit predictors is compared by selection group 64. Further inspection reveals that the halftone selection process that takes place in selection group 62 is itself a two-tiered approach more complex than the selection process preformed by selection group 64 and results in the selection of the halftone predictor which had the best performance two bytes previously. At the second step, in selection group 66, the performance of the selected halftone predictor is compared with the performance of the selected nonhalftone predictor. Having determined which predictor performed best on the previous data block, selection group 68 outputs, as the adaptive predictor output, the error code that the selected predictor has generated on the current byte.

The selection group 62 performs the selection process which is described in FIG. 3 by equations A-10 and A-11. The error count of the halftone predictors from the previous data byte are input to selector 70 along with the information indicating which of the halftone predictors had the lowest error count on the previous adaptive cycle, newHT signal 72. Selector 70 compares the respective error counts and selects the lowest with ties resolved in favor of the halftone predictor previously selected in the comparison or the predictor corresponding to the highest screen frequency as indicated A-11. The output of selector 70 is stored in register 74 at the next adaptive cycle. Signal 72 is referred to in FIG. 3 as newHT$_{i-2}$. (Note in FIG. 4 * indicates i-1 and ** indicates i-2). NewHT, signal 72, is input to the select input of multiplexor 76 in order to select as the output of multiplexor 76 the error count of newHT on the previous byte, signal 78. Signal 78 is compared in selector 80 to signal 82, the error count on the previous byte of the halftone predictor selected on the previous adaptive cycle as ht, signal 84. Ht is referred to in FIG. 3 as ht$_{i-2}$. Selector 80 resolves ties in favor of ht and its output indicates which of the two inputs has the lowest error count. The output of selector 80 is input to the select input of multiplexor 86. Multiplexor 86 has as its inputs newHT, signal 72, and ht, signal 84; multiplexor 86 selects one or the other as its output depending on the value of its select input. The output of multiplexor 86 is input to register 88 for the next adaptive cycle. The value stored in register 88 is ht, signal 84. It is the performance of the halftone predictor which has been selected as ht that will be compared to the performance of the selected nonhalftone predictor. Signal 84 is input to the select input of multiplexor 89 to select the error count corresponding to ht's performance on the previous byte. Signal 82, the output of multiplexor 89, is output to selection group 66 for comparison with the selected nonhalftone predictor.

The selection group 64 performs the selection process which is described by FIG. 3 equation A-8. The error count of the nonhalftone predictors from the previous byte are input to selector 90 along with information indicating which of the nonhalftone predictors had the lowest error count on the previous adaptive cycle, signal 92. Selector 90 compares the respective error counts and selects the lowest with ties resolved in favor of the nonhalftone predictor previously selected in the comparison as indicated by FIG. 3, equation A-8. The output of selector 90 is nonHT, signal 94, referred to in FIG. 3 as nonHT$_{i-1}$. NonHT, signal 94, is stored in register 96 at the next cycle and input to the select input of multiplexor 98. This forces the selection of the error count of the predictor selected as nonHT to be the output, signal 100, of multiplexor 98. Signal 100 is delivered to selection group 66 for comparison with signal 82 to determine which predictor is to be used to predict the next data block. NonHT, signal 94, is also delivered to selection group 68 to select the proper error code.

The selection group 66 performs the selection process which is described in FIG. 3 by equation A-9. The error count from the selected halftone predictor, signal 82 and from the selected nonhalftone predictor, signal 100, are input to selector 102 along with information indicating whether a halftone or nonhalftone predictor had been selected on the previous cycle, signal 104. Selector 102 compares the respective error counts and selects the lowest with ties resolved in favor of the predictor of the type selected in the previous cycle. The output of selector 102, signal 106, is delivered to selection group 68 to select the error code corresponding to the selected signal. Signal 106 is also stored in register 108 at the next cycle.

The selection group 68 performs the selection process which is described in FIG. 3 by equation A-12. NonHT, signal 94, is input to the select input of multiplexor 110 and forces the selection as the output, signal 112, of multiplexor 110 the error code of the selected nonhalftone predictor. Signal 112 along with the error code of the selected halftone predictor, which is selected in the same manner as the nonhalftone error code described previously (not shown), signal 114, is input to multiplexor 116. Signal 106 is input to the select input of multiplexor 116 and forces the selection of the error code corresponding to the selected predictor as the output of multiplexor 116. This output, signal 118, is the predictor output ready for encoding.

The predictor output can be depredicted into original data by use of the algorithm herein disclosed without the addition of extra address code indicating which of the plurality of predictors was used for encoding. That is, the receiver can determine which depredictor to use by examining past depredictor performance in the manner described above. Furthermore, the circuit herein disclosed does not require additional hardware to buffer the output of the plurality of predictors pending selection of a predictor since the predictor selected for the present block is based on a comparison of performance on the previous block.

While the invention has been described with reference to specific embodiments, it will be understood by those skilled in the art that various changes will be made and equivalents may be substituted for elements thereof without departing from the true spirit and scope of the invention. Specifically, while prediction has been discussed on a byte by byte basis, the circuit and method herein disclosed is applicable to data blocks of any length. In addition, many modifications may be made without departing from the essential teachings of the invention.

I claim:
1. A system for adaptively predicting a block of image data comprising:
 a plurality of predictors, each using a different predictor pattern for predicting the data bits of each image data block,
 a comparator for each predictor for generating an error code representative of the accuracy of the predictions made,
 selector means for selecting one of the predictors, based on its performance on one or several previous data blocks, and means responsive to the output of said selector means for outputting the error code for the current block using the selected predictor.

2. The system according to claim 1 in which said plurality of predictors includes a nonhalftone and halftone predictor class,
   said nonhalftone predictor class making predictions based on the value of immediately adjacent bits, on the current or previous line, and
   said halftone predictor class making predictions based on the value of bits which are several positions earlier in the current or previous lines.

3. The system according to claim 1 wherein said selector means will resolve ties in favor of the predictor previously selected.

4. The system according to claim 2 wherein said selector means will resolve ties in favor of the predictor of the same class as the predictor previously selected.

5. The system according to claim 2 in which each halftone predictor pattern is a single bit located several positions earlier in the current line.

6. The system according to claim 1 in which said means for outputting comprises a multiplexor which uses the current error codes of said prediction means as the data input.

7. The system of claim 2 wherein said selector means will select a new halftone pattern over a previously selected halftone pattern only if the performance of said new pattern is better than the performance of said previously selected pattern for the two consecutive data blocks immediately prior to the current data block.

8. The method of adaptively predicting a series of blocks of image data comprising the steps of:
   first using a plurality of predictors for generating error codes for one or a plurality of previous consecutive data blocks,
   selecting the best predictor based on its performance, and
   second using said selected predictor for generating the output error code for the current block.

9. The method of claim 8 wherein said plurality of predictors includes a nonhalftone class and a halftone class, said nonhalftone predictor class having pattern bits adjacent the current bit on the current or previous lines, said halftone class having pattern bits located several positions earlier in the current or previous lines.

10. The method of claim 8 in which ties are resolved in favor of the predictor previously selected.

11. The method of claim 9 in which ties are resolved in favor of the predictor of the same class as the predictor previously selected.

12. The method of claim 9 in which each halftone predictor pattern is a single bit located several positions earlier in the current line.

13. The method of adaptively predicting a series of blocks of image data comprising the steps of:
   first using a plurality of halftone predictors to generate error code for a plurality of previous data blocks,
   second using one or a plurality of nonhalftone predictors to generate error code for the previous data block,
   selecting; from a group comprising (a) the halftone predictor with the best performance for all of said plurality of previous data blocks, if there is one and (b) all nonhalftone predictors for the previous block; the one with the best performance in generating error code for the previous block, and
   third using said selected predictor to generate output error code for the current block.

* * * * *